United States Patent [19]

Budd

[11] 4,375,731

[45] Mar. 8, 1983

[54] ADAPTER FOR FISHING ROD HOLDER

[76] Inventor: Robert A. Budd, 416 Pembroke Ave., Norfolk, Va. 23507

[21] Appl. No.: 202,187

[22] Filed: Oct. 28, 1980

[51] Int. Cl.$^3$ .............................................. A01K 97/10
[52] U.S. Cl. ..................................................... 43/21.2
[58] Field of Search .................... 43/21.2, 54.5 R, 25; 224/922, 251; 248/538, 520, 523, 314, 515; 285/177; 403/13, 14; 16/2

[56] References Cited

U.S. PATENT DOCUMENTS

| | | | |
|---|---|---|---|
| 1,856,000 | 4/1932 | Smith | 248/523 |
| 2,480,791 | 8/1949 | Valerius | 285/177 |
| 2,787,486 | 4/1957 | Thiry | 16/2 |
| 3,410,097 | 11/1968 | Young | 285/138 |
| 3,745,690 | 7/1973 | Lewis | 43/21.2 |
| 3,964,706 | 6/1976 | Adams | 43/21.2 |
| 3,995,888 | 12/1976 | McIlroy | 285/177 |

*Primary Examiner*—Nicholas P. Godici
*Assistant Examiner*—M. Jordan
*Attorney, Agent, or Firm*—Harvey B. Jacobson

[57] ABSTRACT

An adapter for a fishing rod holder for pivoting the butt end of a fishing rod handle into the central portion of a socket assembly forming a portion of the rod holder to facilitate registry of one of a pair of perpendicularly arranged grooves in the butt end of the fishing rod handle with a transverse pin in the bottom end of the socket assembly to preclude rotational movement of the fishing rod about its longitudinal axis when assembled with the fishing rod holder. The adapter is in the form of a sleeve having an internal bore which flares outwardly and upwardly to guide the butt end of a fishing rod handle toward the smaller portion of the bore and centrally in the tubular member forming the socket assembly. In one embodiment of the adapter, the adapter has a continuous periphery and is machined to accurately fit into standard size socket assemblies. In another embodiment, the adapter is longitudinally split to enable slight variation in the external periphery to facilitate insertion of the adapter into the tubular member forming the socket assembly and to accommodate variations in the interior surface of the tubular member.

3 Claims, 4 Drawing Figures

ADAPTER FOR FISHING ROD HOLDER

BACKGROUND OF THE INVENTION

1. Field of the Invention

The present invention generally relates to an adapter insertable into a fishing rod holder having a tubular socket member with a transverse pin at the lower end thereof and having a shaped internal bore to guide and pilot the butt end of a fishing rod into the central portion of the bottom of the tubular member in order to register a transverse groove in the butt end of the fishing rod with the transverse pin in the bottom of the tubular member.

2. Description of the Prior Art

It is conventional practice to utilize fishing rod holders to retain fishing rods in an upwardly inclined position to eliminate the necessity of a person continuously holding the rod. Also, fishing boats frequently are equipped with a plurality of fishing rod holders so that the number of fishing rods in use can exceed the number of persons on the boat. Such fishing rod holders conventionally employ a tubular member supported from the boat in any of several known manners with the tubular member including an open upper end receiving the butt end or handle end of the fishing rod therein with gravity retaining the fishing rod in the holder. When deep sea fishing or when fishing for large fish, it is desirable to maintain the fishing reel and guide eyes for the line oriented in a specific relationship to the rod to reduce the incidents of line breakage and the like. In order to maintain this relationship and to prevent the fishing rod from rotating about its longitudinal axis, fishing rods are provided with a pair of perpendicularly aligned grooves across the butt end of the handle and the bottom of the tubular member which defines the socket is provided with a transverse pin which is received in one of the grooves. Prior U.S. Pat. Nos. 3,159,366, issued Dec. 1, 1964, and U.S. Pat. No. 3,745,690, issued July 17, 1973, disclose this type of structure in which the tubular socket is provided with a transverse pin at the bottom thereof and the butt end of the fishing rod is provided with a transverse groove or grooves.

In some instances, the size of the tubular member and the butt end of the rod handle is such that when the rod handle is inserted into the socket, the butt end thereof will be off center sufficiently that the transverse groove or grooves in the butt end of the fishing rod will not engage and receive the transverse pin, but rather it will set on top of the pin which enables the fishing rod to rotate about its longitudinal axis in the event a fish takes the bait and exerts tension on the fishing line. While U.S. Pat. No. 3,745,690 locks the fishing rod into the socket, it does not provide any provisions for piloting or centering the butt end of the fishing rod handle in the socket and it also precludes the rapid and free removal of the fishing rod from the socket which is desirable when a fish strikes the line.

SUMMARY OF THE INVENTION

An object of the present invention is to provide an adapter for a fishing rod holder of the type including a tubular socket member having a transverse pin at the bottom end thereof with the adapter being in the form of a block or body conforming in external configuration to the interior of the socket and insertable into the socket from the top thereof with the body being moved to the bottom of the socket against the transverse pin with the body also including a longitudinal bore therethrough which is sufficiently large to receive the butt end of the fishing rod and includes an upwardly and outwardly inclined internal surface for piloting and guiding the butt end of the fishing rod into the central portion of the tubular socket member and into registry with the pin to assure the pin being received in a transverse groove in the butt end of the fishing rod.

A further object of the invention is to provide an adapter in accordance with the preceding object which in one embodiment includes a continuous peripheral surface and in another embodiment includes a longitudinal slot extending radially from the bore to the periphery thereof to enable slight variation in the external size of the adapter to enable it to be more readily inserted into the tubular socket and to frictionally engage the interior surface of the tubular socket to retain it in position.

A further object of the present invention is to provide a piloting and guiding adapter for insertion into a tubular fishing rod holder to guide and pilot the butt end of a fishing rod into the bottom central portion of the fishing rod holder as the fishing rod is inserted into the holder with the adapter being of one-piece construction and constructed of substantially rigid material having some resilience such as various plastic materials.

These together with other objects and advantages which will become subsequently apparent reside in the details of construction and operation as more fully hereinafter described and claimed, reference being had to the accompanying drawings forming a part thereof, wherein like numerals refer to like parts throughout.

DESCRIPTION OF THE PREFERRED EMBODIMENTS

Figure 1:
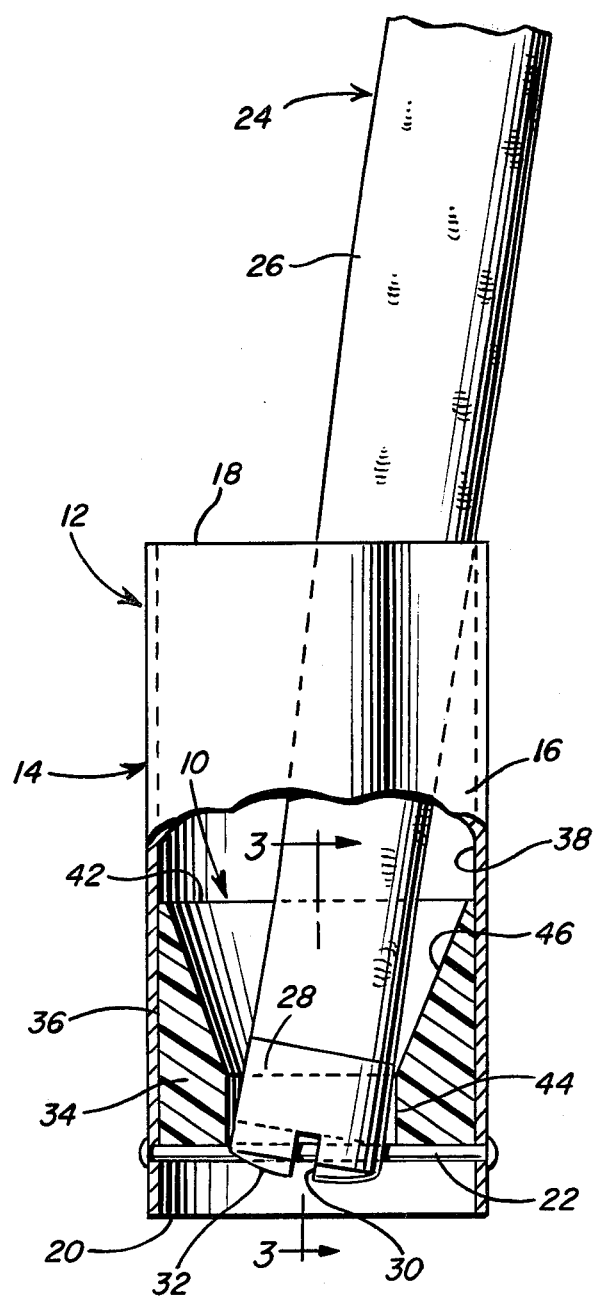
FIG. 1 is an elevational view of the fishing rod and fishing rod holder with a portion of the holder and the adapter of the present invention being shown in section.

Referring now specifically to the drawings, the adapter of the present invention is generally designated by the numeral 10 and is adapted to be inserted into a fishing rod holder 12 which includes a socket assembly 14 in the form of a tubular member 16 having a substantially constant internal diameter from an open top 18 to a bottom end 20 which is also open. A transverse pin 22 is fixedly secured across the tubular member 16 adjacent the bottom end thereof. The length and diameter of the tubular member 16 varies depending upon the installation requirements and the tubular member 16 is usually secured to a boat structure by various conventional fastening means such as the anchoring straps as illustrated in U.S. Pat. No. 3,745,690 in which the tubular member is either vertical or in an inclined upwardly extending orientation. The fishing rod holder 12 as described above is of conventional construction and has standardized dimensions with one outside diameter that is commercially available being 2¼".

Figure 3:
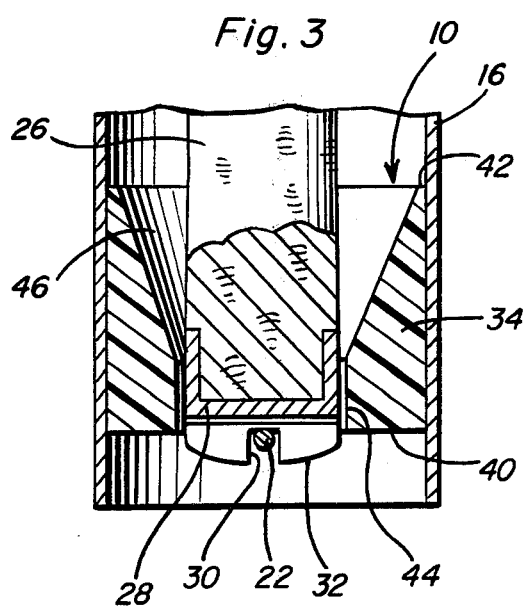
FIG. 3 is a vertical sectional view taken substantially upon a plane passing along section line 3—3 of FIG. 1 illustrating the relationship of the adapter of the present invention, the fishing rod holder and the butt end of the fishing rod.

The fishing rod holder 12 is adapted to telescopically receive the butt end of a fishing rod generally designated by the numeral 24 with the rod handle 26 normally being provided with a butt end ferrule 28 which may be constructed of metal or the like. The ferrule 28 includes a pair of perpendicularly arranged grooves 30 therein which are formed in a rounded or convex end surface 32 of the ferrule 28 with the grooves 30 adapted to receive and be engaged over the transverse pin 22 as illustrated in FIGS. 1 and 3. The fishing rod 24 as described above is conventional and a commercially available product and is used in a conventional manner, that is, by dropping the fishing rod handle downwardly into the socket assembly 14 and twisting the rod handle 26 sufficiently to bring the appropriate groove 30 into registry with the pin 22 so that the pin 22 will enter the groove and lock the rod handle 26 and fishing rod 24 from rotation about its longitudinal axis. This structure still enables ready removal of the fishing rod from the socket when desired and enables the fishing rod 24 to be pivoted to some extent while still in the socket assembly 14.

Figure 2:
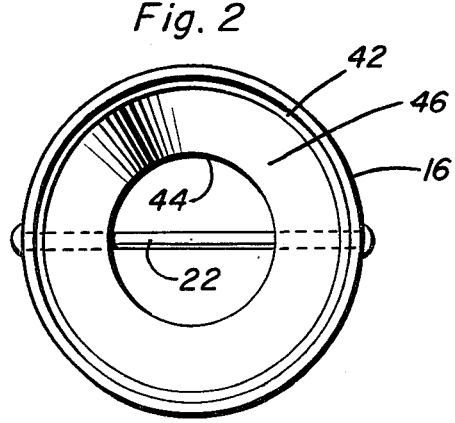
FIG. 2 is a top plan view of the holder with the adapter of the present invention incorporated therein.

The adapter 10 of the present invention is in the form of a block or body 34 having an external periphery 36 engaged with the internal surface 38 of the tubular member 16 with the surfaces usually being cylindrical. The bottom end of the body 34 is substantially planar as at 40 and the upper end thereof is also substantially planar as at 42. Centrally of the body 34, a longitudinal bore 44 is provided for a relatively short portion of the length from the bottom end 40 and an upwardly and outwardly flared or outwardly tapering surface 46 extends from the upper end of the cylindrical bore 44 to the upper end 42 of the body 34 as illustrated in FIGS. 2 and 3, thus defining an inverted frusto-conical surface for guiding and piloting the butt end of the fishing rod handle 26 into the bore 44, thus centering the butt end of the fishing rod handle 26 in relation to the socket assembly 14 so that it is only necessary to rotate the fishing rod about its longitudinal axis in order to bring the proper groove 30 into alignment with and engagement with the transverse pin 22. If the adapter is not in centered position and the diameter of the fishing rod handle 26 is substantially smaller than the internal diameter of the tubular member 16, there is a distinct possibility, and it does frequently occur, that the butt end of the fishing rod handle will be offset in relation to the center of the tubular member 16, that is, against the interior surface of the tubular member 16 in which event the butt end of the fishing rod handle will rest against the pin even though the fishing rod is twisted or rotated about its longitudinal axis thereby accidentally leaving the butt end of the fishing rod setting on top of the pin and out of registry therewith so that the fishing rod 24 can actually rotate about its longitudinal axis when tension is exerted on the fishing line, which frequently can result in the line being broken, thereby loosing not only the fish but also the hook, lure, and the like.

Figure 4:
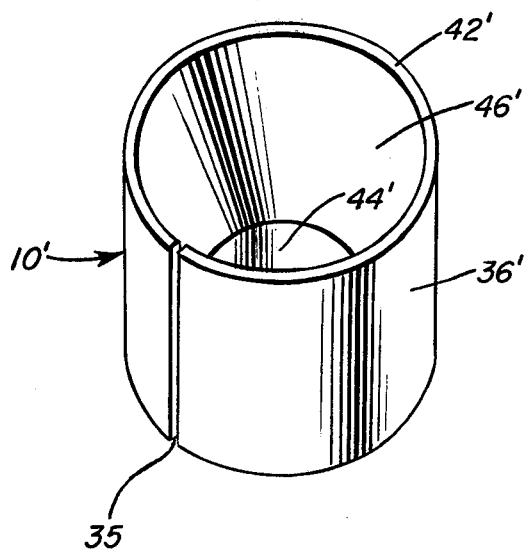
FIG. 4 is a perspective view of the adapter of the present invention illustrating a modified form in which a radial slot is formed in one portion of the periphery thereof.

FIG. 4 illustrates an embodiment of the invention which is substantially identical to that illustrated in FIGS. 1-3 and the same reference numerals are employed but are primed to designate the structure in this embodiment of the invention. As illustrated in FIG. 4, the body 34' is provided with a longitudinal slot 35 which extends radially from the internal bore 44' and the frusto-conical surface 46' to the external surface 36' of the adapter 10'. The slot 35 enables the body 34' to be slightly reduced in external circumference due to its inherent resiliency thus enabling the adapter to be more easily inserted into a tubular member and to enable the adapter to frictionally grip the interior of the tubular member and to be moved downwardly from the upper end to engagement with the pin 22' even though the interior of the tubular member may have some irregularities or out of round areas or the like.

While dimensions may vary, one embodiment of the adapter to be received in a standard 2¼" outside diameter rod holder will have an external diameter of 2⅜", a length of 1½" with the cylindrical bore 44 being ½" and the tapered bore surface being 1" and oriented at a 65° angle. The thickness of the edge 42 should be at a minimum and in a practical embodiment of this invention, this width is 3/32" while the diameter of the bore 44 may be 1⅛". The body 34 may be constructed of stock tubular material such as polyvinylchloride pipe or other substantially rigid plastic materials which may be machined to the desired configuration or the device may be of molded construction, if desired.

If a very large internal diameter fishing rod holder is encountered, it is possible to utilize a cylindrical sleeve insert therein to initially reduce the diameter and then utilize an adapter 10 within the sleeve insert. The sleeve insert may be constructed of the same material as the adapter 10 or may be of any suitable material capable of being slid longitudinally into the tubular member to reduce the internal diameter thereof. If it is desirable, a retaining strap may have its ends attached to the bottom surface 40 of the body 34 with the strap passing under the transverse pin 22. This strap may be in the form of a flexible member and the ends of the flexible strap may be attached to the body 34 in any suitable manner, thereby preventing accidental dislodgment of the adapter 10 from the fishing rod holder 12.

The structure of this invention may be incorporated into existing fishing rod holders constructed of plastic material which are used for stowage of the rods in vertical position when not fishing by molding the guiding and piloting tapering surface directly into the interior surface of the tubular member. Also, the metal tube can be inwardly tapered at its lower end by any of several well-known procedures.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a fishing rod having a pair of perpendicular transverse grooves in the butt end of the handle and a fishing rod holder comprising an elongated tubular member having a cylindrical interior of constant diameter and provided with open upper and lower ends, a diametric pin adjacent the lower end of said tubular member, said pin being received in one of said grooves when the handle is inserted into the tubular member to prevent rotation about its longitudinal axis, the diameter of the tubular member being substantially greater than the handle to enable the fishing rod to pivot in relation to the tubular member and in some instances enabling the pin to engage surfaces of the butt end of the handle laterally of the grooves when not centered in relation to the tubular member thereby allowing the rod to rotate about its longitudinal due to tension exerted on the fishing line by a fish taking the hook so that the fishing reel, line and guide eyes swing toward the pull on the fishing line, that improvement comprising a cylindrical adapter inserted into the tubular member and oriented adjacent said pin for guiding and piloting the butt end of the fishing rod into engagement with the transverse pin in the tubular member, said adapter including a central bore extending therethrough with the upper end of the bore being outwardly tapered to form a funnel-shaped surface, said adapter including a thin upper edge merging with the interior surface of the tubular member to eliminate shoulder surfaces on which the butt end of the handle could rest, said adapter being of constant diameter for insertion into the upper end of the tubular member and downward movement into engagement with the pin, said adapter having a length substantially less than the tubular member to avoid interference with pivoting movement of the handle about a transverse axis and enabling unhindered removal of the fishing rod and easy insertion thereof with the rod being easily rotated a partial turn to register an appropriate groove with said pin.

2. The structure as defined in claim 1 wherein said adapter includes a cylindrical body having a continuous peripheral surface.

3. The structure as defined in claim 1 wherein said adapter includes a cylindrical body having an elongated slot extending radially from the inner bore to the exterior thereof and extending longitudinally from end-to-end to enable slight variation in the external circumference of the body during insertion into the tubular member.

* * * * *